United States Patent [19]

McLaughlin et al.

[11] 4,374,739

[45] Feb. 22, 1983

[54] OIL WELL TREATING METHOD AND COMPOSITION

[75] Inventors: Homer C. McLaughlin; Jimmie D. Weaver, both of Duncan, Okla.

[73] Assignee: Halliburton Company, Duncan, Okla.

[21] Appl. No.: 117,938

[22] Filed: Feb. 4, 1980

Related U.S. Application Data

[63] Continuation of Ser. No. 901,664, May 4, 1978, which is a continuation-in-part of Ser. No. 714,213, Aug. 13, 1976, abandoned.

[51] Int. Cl.$^3$ .................... E21B 43/12; E21B 43/25
[52] U.S. Cl. .................... 252/8.55 R; 166/305 R; 166/307; 166/308; 252/8.55 D; 405/264
[58] Field of Search .......... 252/8.5 C, 8.55 R, 8.55 C, 252/8.55 D; 166/275; 405/264

[56] References Cited

U.S. PATENT DOCUMENTS

| | | | |
|---|---|---|---|
| 2,761,843 | 9/1956 | Brown | 252/8.55 |
| 2,841,222 | 7/1958 | Smith | 252/8.5 X |
| 3,095,404 | 6/1963 | Lincoln et al. | 526/287 |
| 3,377,274 | 4/1968 | Burke et al. | 210/734 X |
| 3,412,019 | 11/1968 | Hoover et al. | 210/734 |
| 3,500,925 | 3/1970 | Beiswanger et al. | 166/275 |
| 3,791,446 | 2/1974 | Tate | 252/8.55 X |

FOREIGN PATENT DOCUMENTS 1202497  8/1970  United Kingdom .................. 526/40

OTHER PUBLICATIONS

Moore, Article in *The Petroleum Engineer*, Mar. 1960, pp. B78, B90, B94–B96, B98–B100.

*Primary Examiner*—Herbert B. Guynn

[57] ABSTRACT

A particular simple method and class of organic polycationic polymer compositions are provided for treating earthen formations such as in oil wells to stabilize clay against dispersion and expansion due to water.

4 Claims, No Drawings

OIL WELL TREATING METHOD AND COMPOSITION

This application is a continuation of application Ser. No. 901,664 filed May 4, 1978 which in turn is a continuation-in-part of Ser. No. 714,213 filed Aug. 13, 1976, now abandoned.

Production of petroleum hydrocarbons is often troubled by the presence of clays and other fines capable of migrating in the formation. Normally, these fines, including the clays, are quiescent causing no obstruction to flow to the well bore via the capillary system of the formation. When the fines are disturbed, they begin to migrate in the production stream and, too frequently, they encounter a constriction in the capillary where they bridge off and severely diminish the flow rate.

The agent that disturbs the quiescent fines is frequently the introduction of a water foreign to the formation. The foreign water is often fresh or relatively fresh water compared to the native formation brine. The change in the water can cause fines to disperse from their repository or come loose from adhesion to capillary walls.

Sometimes the loss of permeability is due to clay swelling with relatively fresh water without migration. But, often clay swelling is accompanied by migration of fines. Sometimes non-swelling clays can respond to the foreign water and begin to migrate. It is believed that swelling clays are the major mechanism of fines migration and/or swelling, because when formation cores are analyzed, the presence of swelling clays are an excellent indicator that the formation will be sensitive to foreign water intrusion, while the presence of non-swelling clays only is inconclusive.

Generally, swelling clays are in the smectic group including clay minerals such as montmorillonite, beidellite, nontronite, saponite, hectorite and sauconite. Of these, monmorillonite is the clay mineral found most commonly in formation core analysis. Montmorillonite is commonly associated with clay minerals known as mixed-layer clays. For further information, refer to Jackson's TEXTBOOK OF LITHOLOGY, pages 95 to 103.

Migrating fines including a host of clay and other minerals in minute particle size, for example: feldspars, fine silica, allophane, biotite, talc, illite, chlorite and the swelling clays themselves. For additional information, see Theng's THE CHEMISTRY OF CLAY-ORGANIC REACTIONS, pages 1 through 16.

Clays can also cause trouble in areas other than permeability reduction. When they are a component in shales, sandstones, or other formations, contact with a foreign water or at times with any water can cause the formation to lose strength or even disintegrate. This is a problem in building foundations, road beds, drilling wells and any situation where the formation strength is important.

There have been numerous attempts to control the ill effects of water on clay and/or other fines. These have been principally in the oil industry. One idea is to convert the clay from the swelling sodium form (or the more rare swelling lithium form) to another cation form which does not swell as much.

Example cations that form relatively non-swelling clays are potassium, calcium, ammonium and hydrogen ions. When a solution of these cations, mixed or individually, flows past a clay mineral, they readily replace the sodium ion and the clay is transformed to a relatively non-swelling form (refer to Theng, Tables 2, 3, and 4). The use of acid, potassium, calcium, or ammonium ions to exchange for sodium ion has been successful in preventing damage to formations susceptible to plugging or disintegrating due to clays in their compositions.

The prior art and conventional features useful with this invention are described in references cited and/or discussed herein. Each reference cited or discussed herein is incorporated herein by reference to any extent deemed necessary for any purpose. Prior art references are cited as follows:

U.S. Pat. No. 2,761,843
U.S. Pat. No. 3,625,684
U.S. Pat. No. 2,801,984
U.S. Pat. No. 3,660,431
U.S. Pat. No. 2,801,985
U.S. Pat. No. 3,666,810
U.S. Pat. No. 2,940,729
U.S. Pat. No. 3,738,437
U.S. Pat. No. 3,334,689
U.S. Pat. No. 3,741,307
U.S. Pat. No. 3,382,924
U.S. Pat. No. 3,827,495
U.S. Pat. No. 3,419,072
U.S. Pat. No. 3,827,500
U.S. Pat. No. 3,422,890
U.S. Pat. No. 3,833,718
U.S. Pat. No. 3,483,923
U.S. Pat. No. 3,974,220
U.S. Pat. No. 3,494,965
U.S. Pat. No. 4,069,365
U.S. Pat. No. 3,578,781
U.S. Pat. No. 4,073,763
U.S. Pat. No. 3,603,399

24. Barkman, J. H.; Abrams, A.; Darley, H. C. H.; & Hill, H. J.; "An Oil Coating Process to Stabilize Clays in Fresh Water Flooding Operations," SPE-4786, SPE of AIME Symposium on Formation Damage Control, New Orleans, La., Feb. 7-8, 1974.
25. Coppel, Claude E.; Jennings, Harley X.; & Reed, M. G.; "Field Results From Wells Treated With Hydroxy-Aluminum," JOURNAL OF PETROLEUM TECHNOLOGY (Sept. 1973) pp. 1108-1112.
26. Graham, John W.; Monoghan, P. H.; & Osoba, J. S.; "Influence of Propping Sand Wettability of Productivity of Hydraulically Fractured Oil Wells," PETROLEUM TRANSACTIONS, AIME, Vol. 216 (1959).
27. Hower, Wayne F.; "Influence of Clays on the Production of Hydrocarbons," SPE-4785, SPE of AIME Symposium on Formation Damage Control, New Orleans, La., Feb. 7-8, 1974.
28. Hower, Wayne F.; "Adsorption of Surfactants on Montmorillonite," CLAYS AND CLAY MINERALS, Pergamon Press (1970) Vol. 18, pp. 97-105.
29. Hoover, M. F., & Butler, G. B.; "Recent Advances in Ion-Containing Polymers," J. POLYMER SCI, Symposium No. 45, 1-37 (1974).
30. Jackson, Kern C.; TEXTBOOK OF LITHOLOGY, McGraw-Hill Book Company (1970) (Library of Congress Catalogue Card No. 72-958LO) pp. 95-103.
31. Theng, B. K. G.; THE CHEMISTRY OF CLAY-ORGANIC REACTIONS, John Wiley &

Son (1974) (Library of Congress Catalog Card No. 74-12524) pp. 1-16.
32. Veley, C. D.; "How Hydrolyzable Metal Ions Stabilize Clays To Prevent Permeability Reduction," SPE-2188, 43rd Annual Fall Meeting of SPE of AIME, Houston, Texas (Sept. 29-Oct. 2, 1968).
33. Milchem Incorporated, "Milchem's SHALE-TROL Sticky Shale Can't Stop You Anymore," DF-5-75 1M.
34. Chemergy Corporation, "Maintain Maximum Production With PermaFIX and PermaFLO Treatments for CLAY/FINE and SAND CONTROL."

However, the exchanging of other ions for sodium on clay is only a temporary remedy. When a well is produced, the presence of sodium ion in the formation water will enable sodium ion to counter replace hydrogen, potassium, ammonium or calcium ion quickly. As a result, the clay is returned to the swelling or dispersible form, ready to cause damage should a foreign water be introduced. Veley et al '924 column 3, lines 45 through 75 and including lines 1, 2 and 3, column 4, employes calcium ion to replace the sodium ion in the core clays (lines 51-53). The calcium ion protects the core (lines 54-57). If treatment is omitted (lines 58-63), then the sodium chloride brine (line 64) will counter replace the calcium and the core will be severely restricted in flow in step 7 (lines 65-68) as stated in line 75, column 3, and lines 1-3, column 4.

Since simple cations are easily exchanged away and the treatment is not permanent, there have been endeavors to improve on treatment with hydrogen, potassium, calcium or ammonium ions (and probably some others). Among the more successful are the inorganic polycationic polymers or complexes. The most prominent among these are $ZrOCl_2$ and $Al(OH)_xCl_y$. Veley et al '924 and the article "How Hydrolyzable Metal Ions Stabilize Clays to Prevent Permeability Reduction" cover the subject of $ZrOCl_2$ with the polycationic nature of $ZrOCl_2$ explained in SPE-2188. Hydroxy-aluminum reaction products of HCl and $Al(OH)_3$, with formulae ranging from $Al(OH)_{1.5}Cl_{1.5}$ to $Al(OH)_{2.7}Cl_{0.3}$, is disclosed in the Marion G. Reed patents and the article "Field Results From Wells Treated with Hydroxy-Aluminum."

The inorganic polycationic polymers or complexes are quite successful in controlling migrating fines and swelling clays. However, they have limitations of several sorts. Hydroxy-aluminum requires a cure time after it is placed in the presence of clay; this cure time is a disadvantage in that rig and production time is consumed during the wait. Hydroxy-aluminum can tolerate only a limited amount of carbonate material in the formation. Also, hydroxy-aluminum can be removed by a subsequent acid treatment of the formation. Zirconyl chloride is limited in the pH range of the placement fluid and can be removed by acid under certain conditions. For other type clay treatments see U.S. Pat. No. 3,741,307.

Another treatment to control the undesired effects of swelling clays and migrating fines is the use of organic cationic surfactants. If the organic part of the cation is large enough, the organic cation is not readily replaced. See the references by Wayne F. Hower. Cationic surfactants have a tendency to oil wet the formation which some persons consider an advantage (see reference by J. H. Barkman). However, many petroleum engineers consider oil wetting of the formation to be a disadvantage because it retards the production of oil and accelerates the production of aqueous fluids (see reference by J. W. Graham).

This invention is the use of organic polycationic polymers to prevent or reduce the ill effects of swelling clays and/or migrating fines in earth formations. An aqueous solution of the organic polycationic polymer is flowed past the clay to be treated without dispersing the formation particles until the organic polycationic polymer replaces the clay cation, normally sodium ion, and transforms the clay to a more stable form that is much less likely to swell or migrate. The organic polycationic polymers of this invention have several advantages. They can be applied to all types of formations regardless of carbonate content. They are acid resistant, i.e., the formation can be treated with acid later, without destroying their clay treating ability. They are placeable in water solutions including a wide range of brines and acids. The treatment with organic polycationic polymers is essentially permanent. The organic polycationic polymers are very resistant to being removed by brines, oils, or acids. Oil wetting of the formation can be avoided. They can be made pH tolerant. No cure time is required; tests indicate that less than one minute is required for adsorption on the clay to be complete. Very low permeability formations can be treated. They can give high permeability retention after the clays and fines are treated. Wide formation temperature ranges can be accommodated. The polymers were tested at 70°-300° F. but the range could be wider. Some polymers have been tested up to about 500° F. with flowing steam and showed no sign of allowing permeability reduction in clay-sand packs.

There is a wide range of applications for the organic polycationic polymers. These applications involve using the organic polycationic polymers alone, as the primary treating agent, or as an auxilliary in other treatments.

The invention of this application comprises basically a certain class of organic polycationic polymers and methods of their application. The polymers have a molecular weight over about 800 or 1,000 and preferably above 1,500 and up to about 3,000,000 and preferably less than about 100,000. The organic polycationic polymers can be applied to any earthen formation or permeable mass containing clay where clay swelling could present a problem. The polymers can be used to treat both naturally and artifically consolidated structures or man-made consolidations.

Any suitable method of application can be used in view of this disclosure. For some applications such as surface or exposed structures, it may be desirable to merely spray the polymer onto the permeable mass. The essential feature is contact between the clay particles to be treated and the polymer. A preferred method uses a carrier fluid. A preferred carrier fluid is water or an aqueous media. The water can contain other ingredients which do not substantially interfere with dispersion or dissolution of the polymer in the media. The water carrier may be gelled or thickened for certain applications. Such ingredients or additives can include salts, mineral acids, low molecular weight organic acids, cationic or nonionic surfactants (anionic surfactants can be used with a mutual solvent), wetting agents, or coupling agents such as silanes or conventional additives used in consolidation treatments, stimulation treatments or drilling of oil wells. The carrier fluid can also be a normally liquid polar-substituted hydrocarbon such as an alcohol. Normally, a polar hydrocarbon will be necessary to satisfactorily disperse or dissolve the polymer within the carrier. Under certain conditions, the polymer may be dispersed or emulsified in a non-polar carrier liquid. The carrier fluid preferably has a boiling point in the range of about 25°–200° C. and a viscosity of less than about 10 cp. Higher viscosity fluids might be used for certain applications (such as fracturing, sand consolidation, sand packing or gravel packing) but are generally not practical from pressure or pumping requirements. The organic polycationic polymer should be present in the carrier fluid in a concentration within the range of about 0.01–25% by volume of the carrier fluid. Lower or higher concentrations can be used but are generally not practical.

A preferred aqueous carrier fluid is a saline solution containing about 0–40% salt up to about saturation limits at the applicable temperature. The preferred salt concentration is about 2–12% by weight; however, concentrations up to about 35% can be used, as well as fresh water. The salt can be an alkali metal salt, alkaline earth metal salt, ammonium salt or combinations thereof. These include the halides, sulfates, carbonates, oxides or combinations thereof. The halides of potassium, sodium, magnesium, calcium, ammonium and combinations thereof are preferred due to economics and solubility. Aqueous acids of about the same concentrations can also be used. These acids include acetic, formic, hydrofluoric, hydrochloric, nitric, phosphoric, sulfurous, and sulfuric. Low molecular weight organic acids such as acetic and sulfonic can also be used under some conditions. Conventional additives such as inhibitors, surfactants, coupling agents, wetting agents and others can be used where desirable and especially where the organic polycationic polymer is used with conventional treatment procedures. The carrier fluid preferably contains salts or acids which will shrink or prevent swelling until the polycationic polymer has treated the clay particles. Normally, the treatment is practically instantaneous with contact between the formation and treatment fluid. Use, production or flow through the formation can usually be resumed within several hours, e.g. 2–3, and in practically all cases in less than 18 or 24 hours. The carrier fluid and formation are brought into contact by injecting the carrier fluid into the formation, applying the fluid to the formation, or flowing the fluid past the formation in a manner to cause minimum disturbance of individual particles within the formation. Thus, the treatment procedure of this invention is useful where permeability is low and maintaining of maximum permeability is a critical feature.

In chemical grouting operations such as sealing leaks in dams, mines, tunnels, basements, and the like (see references Rakowitz '729, Morgan '984, Roth '985 and McLaughlin '689), there are occasions where the permeability decreases and the formation refuses to take chemical grout. This is normally caused by pH or osmotic disturbance brought about by introducing a foreign water (chemical grout) into the formation. By pretreating the grout hole with an organic polycationic polymer, the permeability can be maintained open so that sufficient chemical grout can be injected until it spreads to a large enough radius to seal off leaks.

In the production of gas, oil and/or water wells a problem frequently arises where the soft formation breaks off around the well bore and sand is produced. Since production of sand is highly undesirable, several means of stopping sand production have been devised, one of which is gravel packing. Gels and/or brines are used to wash gravel, usually graded sand or particulate material, into place around the well bore in the producing interval.

In one technique the gravel or sand is allowed to settle and compact. Subsequently, a liner or screen is washed into the well and positioned across the formation. The pack sand now restrains the formation sand and the screen retains the pack sand. This permits the production of sand free fluids. However, when the gravel is being pumped into place, the loose formation solids are pressed back, forming a compaction front between the formation and pack sand. This front, particularly if it contains clays, often restricts fluid flow into the well bore after the gravel pack is in place. The use of organic polycationic polymers in a preflush, in the gravel pack carrying fluid, or in a fluid after the gravel pack is in place, can eliminate or relieve the loss of permeability in the compaction front. Also, organic polycationic polymers flushed out beyond the gravel pack vicinity can prevent migration of fines into the gravel pack where the fines often plug the gravel pack.

Fracturing with sand or sand packing any cavity may be similar to gravel packing except that the grain size may be different. The use of organic polycationic polymers in conjunction with sand fracturing produces the same beneficial result.

Sand consolidation employes hard setting resins to stick sand grains together. The formation sand itself can be so treated or a pre-resin coated sand employed as a sand pack can be used. The use of organic polycationic polymers in conjunction with sand consolidation can prevent the migration of fines and clays back into the sand consolication mass and reduce the plugging action of a compaction front, should one form.

In secondary recovery operations where waterfloods are used to recover oil, frequently the only available water for injection into injection wells is likely to cause clay swelling and/or fines migration which can plug the injection wells. Preliminary treatment of injection wells with organic polycationic polymers before flooding with the suspect water can prevent damage by migrating fines and clay swelling. This is particularly vital in the immediate vicinity of the well bore where the permeability is so important. The treatment can be used to alter the water wetting characteristics of a formation or prevent any decrease in oil permeability in any formation due to oil wetting of the formation where clay might present a problem.

Certain formations are naturally cemented or consolidated together with substances that are removed or weakened by water contact. As long as hydrocarbons are produced alone, the wells give little trouble. However, when the water table rises in the course of production and water starts to coproduce with the hydrocarbons, sand will start to produce. Sometimes the situation is so bad that hole collapse results. When the formation cementation material is clay, the treatment of the well bore vicinity prior to water breakthrough can prevent sand production and/or hole collapse.

When oil and gas wells are cased, it is necessary to perforate the casing or to drill out a section of open hole below the casing in order to complete the well and start production. A hazard in this well completion operation is that the fluid in the well bore will damage the permeability because it often rushes into the formation when it is opened up. The well can be completed as an open hole, or by perforating using shaped charges or bullets. As a component in the completion fluid, organic polycationic polymers have a purpose of preventing damage to permeability should pressure in the well be higher than formation pressure and the well fluids enter the formation.

Acidizing is a common technique in the art of improving well production. Acid is pumped into the formation for the purpose of enlarging the pores and thus increasing permeability. Hydrochloric acid is commonly used in carbonate formations such as limestone and dolomite and hydrofluoric acid solutions are often used in sandstones. However, in some formations, acidizing loosens fines so that they migrate and cause plugging. A characteristic of these formations is that acidizing improves production, but a decline in production rate soon sets in as fines migrate to plugging positions. The use of organic polycationic polymers before, during, and/or after acidizing minimizes fines production.

Hydraulic fracturing is another common technique in the art of improving well production. The well bore is pressured up until the formation bursts and the resulting fracture exposes large areas of producing formation face. The cracks are normally prevented from healing closed by pumping sand into the fracture. However, fracturing fluid that bleeds into the fracture face often interacts with clays and damages permeability. This damage is particularly critical when the permeability is low, i.e., about 10 millidarcies to 0.1 millidarcy. The use of organic polycationic polymers in conjunction with fracturing operations has been quite successful.

It is much better to prevent damage by swelling clays and/or migrating fines than to try to correct the damage after it occurs. Much of the damage is irreversible. However, in cases where the damage has already happened, the use of organic polycationic polymers as the primary treating agent in conjunction with other treatments can restore much of the lost permeability.

Wells in the process of being drilled, particularly air or gas drilled wells, often are troubled by the swelling and heaving of formations traversed by the well bore. These formations contain clay minerals, that when wet with aqueous fluids, such as mist or foam drilling, will cause sloughing of the formation, frequently causing a danger of sticking the drill string and/or bit in the hole. Some of these formations are referred to in the art as "gumbo shale." Treatment and/or impregnation of these formations with compositions of this invention can alleviate the danger of swelling or heaving formations. The treatment can also be used in drilling or completion operations where two-phase fluids, such as emulsion, foam, fog, smoke or gaseous dispersion, mist or slurry, are used.

The organic polycationic polymers of this invention can generally be considered quaternary polymers with nitrogen or phosphorous as the quaternary or cationic atom with an aliphatic, cycloaliphatic or aromatic chain. Trivalent or tertiary sulfur can substitute for the quaternary nitrogen or phosphorous in the polymers. The cationic atom to carbon atom ratio is preferably about 1:2 to 1:36 and the molecular weight is above about 1,000. The organic polycationic polymer is polar and therefore generally soluble or readily dispersible in polar solvents or carrier fluids such as an aqueous media or an alcohol, or another substitute hydrocarbon can be used as the carrier fluid where it is desirable to avoid contact between water and the permeable mass or formation to be treated. Examples of these polycationic polmers include polyethyleneamines, polyvinylpyridinium salts, or polyallylammonium salts.

Preferred organic polycationic polymers of this invention can be characterized and illustrated by the following formula and examples.

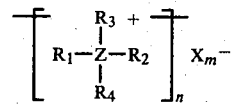

wherein
$R_1$ is an organic aliphatic, cycloaliphatic, or aromatic radical containing 2–40 carbon atoms or a hydrogen radical and when $R_1$ is cycloaliphatic Z and $R_2$ can be in the ring;
$R_2$, $R_3$ and $R_4$ are organic radicals independently defined as $R_1$ containing 0–6 carbon atoms and 0–2 oxygen or nitrogen atoms; when $R_1$ is cycloaliphatic it may or may not be in the organic polycationic polymer chain; when
Z is sulfur $R_4$ is not present;
Z is a cation such as those derived from nitrogen, phosphorous or sulfur;
X is an anion such as halide, nitrate, sulfate, bisulfate, carbonate, hydroxide, borates, oxides, azides, cyamides, phosphates, etc.;
n is an integer equal to the number of monomer units in the polymer required to give a molecular weight in the range of about 800–3,000,000 and preferably at least about 1,000; and
m is an integer equal to the number of anions required to maintain electronic neutrality.

The organic or hydrocarbon radicals can be linear, branched or cycloaliphatic radicals, aromatic radicals, unsaturated radicals, substituted radicals or combinations thereof. The organic radicals can be homoaliphatic or heteroaliphatic, i.e., may or may not contain other atoms such as oxygen or nitrogen. The organic radicals can be homocyclic or heterocyclic, i.e., may or may not contain other atoms such as oxygen or nitrogen. Thus, the organic radicals can be substituted or unsubstituted alkyl, aryl or combinations thereof with each radical having 0–40 and preferably 0–6 carbon atoms.

The above class of organic polycationic polymers can be divided into the following preferred subclasses:

A. Alkyl Polycationic Polymers

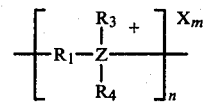

wherein
$R_1$ is a divalent normal or branched chain alkylene group containing 2–40 carbon atoms, preferable range 2–12 carbon atoms;
$R_2$ is contained within $R_1$;
$R_3$ is normal or branched alkyl or hydrogen containing 0–6 carbon atoms and preferably 1–3 carbon atoms;
$R_4$ is radical defined the same as $R_3$, but it may or may not be identical to $R_3$, e.g., $R_3$=methyl and $R_4$=propyl; when Z is sulfur $R_4$ is not present;

Z is a cation such as those derived from nitrogen, phosphorous, or sulfur;

X is an anion such as halide, nitrate, sulfate, hydroxide, etc.;

n is an integer equal to the number of monomer units in the polymer required to give a molecular weight in the range of about 1,500–3,000,000; and m is an integer equal to the number of anions required to maintain electronic neutrality.

For the above subclass, preferred molecular weight ranges are up to about 150,000, especially about 30,000–150,000 for minimum viscosity and about 30,000–3,000,000 for higher viscosity aqueous solutions of the polymers. One preferred group of this subclass is applied in a carrier fluid at a pH greater than about 4, especially in the range of about 5–9. In another preferred group when Z is nitrogen, at least one of $R_3$ and $R_4$ is not hydrogen, methyl, ethyl or propyl.

B. Heteroaliphatic Polycationic Polymers

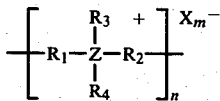

wherein $R_1$ is arylene, alkylene, arylalkylene, alkylarylene, alkenylene or combinations thereof. When $R_1$ is alkyl it contains or has appended one or more hetero atoms or groups. When $R_1$ is aryl, or alkyl aryl it can contain or have appended one or more hetero atoms or groups. $R_1$ can be normal-hetero-alkyl or it can be branched extensively through the hetero-atoms or groups. The hetero-atoms or groups may be ethylenic (—CH=CH—, acetylenic (—C≡C—), aryl, or nitrogen, phosphorous, or sulfur, in regular covalent bonding, partially oxidized, e.g., sulfone, or in the onium state, other hetero atoms or groups may be oxygen, hydroxyl, carbonyl, or covalent halogen. With the exception of ethylenic, or aryl, a hetero atom or group is not bonded directly to Z.

$R_2$ is an unsubstituted alkyl or it can be defined as $R_1$ but it is not required to be identical to $R_1$. $R_2$ can be included in $R_1$.

$R_3$ can be alkyl containing 1–6 carbon atoms, hydrogen or it can be defined as a monovalent form of $R_1$ but it is not required to be identical to $R_1$.

$R_4$ can be defined as $R_3$ but it is not required to be identical to $R_3$. When Z is sulfur $R_4$ is not present.

Z is a cation such as those derived from nitrogen, phosphorous or sulfur.

X is an anion such as halide, nitrate, sulfate, hydroxide, etc.

n is an integer equal to the number of monomer units in the polymer required to give a polymer with a molecular weight in the range of about 800–3,000,000.

m is an integer equal to the number of anions required to maintain electronic neutrality.

The polymer can branch through $R_1$, $R_2$, $R_3$, or $R_4$ in such manner that the main polymer chain is an arbitrary choice and $R_1$, $R_2$, $R_3$, and $R_4$ are arbitrary choices around any particular Z. A preferred molecular weight range is about 1,500–150,000.

A typical branched polymer is shown as follows:

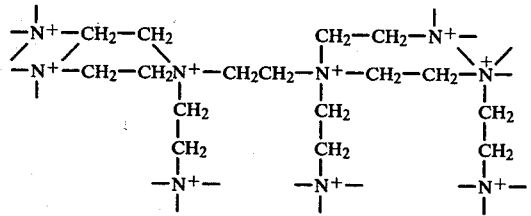

The anions are omitted for clarity.

C. Polycationic Polymers Containing Rings

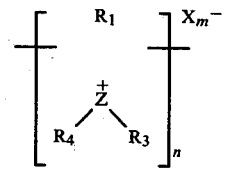

$R_1$ is alkylene, unsaturated alkylene, substituted alkylene, or substituted unsaturated alkylene forming a heterocyclic ring including Z. The heterocyclic ring can be aliphatic, olefinic or aromatic depending on the degree of unsaturation. Substitutions can be alkyl, alkenyl, alkynyl, or aryl branches or substitutions can be hetero atoms or hetero groups contained in the ring, appended to the ring, or appended to the branches. Hetero atoms or groups can be phosphorous or sulfur (in regular covalent, onium or oxidized state, e.g. phosphate or sulfone), nitrogen, oxygen, hydroxyl, carbonyl, or covalent halogen, a restriction being that the hetero atom or group is not bonded directly to Z.

$R_2$ is included in $R_1$.

$R_3$ is a hydrogen radical or an organic radical containing 1–6 carbon atoms and 0–2 oxygen or nitrogen atoms. In the case of certain aryl polycationic polymers, with monomer units bonded through Z and elsewhere on the aryl, $R_3$ may be absent.

$R_4$ is defined the same as $R_3$ but is not required to be identical with $R_3$. When Z is sulfur $R_4$ is absent.

Z is a cation such as those derived from nitrogen, phosphorous or sulfur.

X is an anion such as halide, nitrate, sulfate, hydroxide, etc.

n is an integer equal to the number of monomer units in the polymer required to give a polymer with a molecular weight in the range of about 800–3,000,000.

m is an integer equal to the number of anions required to maintain electronic neutrality.

Bonds containing monomer units may be through Z, other hetero atoms, $R_1$ (1 or 2 sites), or branches on $R_1$. A preferred molecular weight range is about 1,500–150,000.

D. Pendent Polycationic Polymers

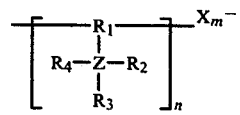

wherein $R_1$ can be alkylene, alkenylene, alkynylene, arylene, and linkages or branches of these in combinations. $R_1$ can contain hetero atoms or groups in the pendent linkage, on branch chains, on or in the polymer linkage. Hetero atoms or groups can be phosphorous or sulfur (in regular covalent, onium, or partially oxidized state, e.g., sulfone), nitrogen oxygen, hydroxyl, carbonyl, or covalent halogen, a restriction being that the hetero atom or group is not bonded directly to Z. The pendent linkage can range from a simple bond to branch of $R_1$ several atoms long connecting Z to the polymer chain.

$R_2$, $R_3$ and $R_4$ can be defined independently as alkyl, alkenyl, aryl or combinations thereof or can be hydrogen, except that they unlike $R_1$ are not in the polymer chain. When $R_2$ is aryl including Z in a heterocyclic ring and/or when Z is sulfur $R_3$ or $R_4$ may not exist.

Z is a cation such as those derived from nitrogen, phosphorous, or sulfur. In one preferred class not more than two of the three R groups can be hydrogen. In another preferred class when $R_2$ is aryl and contains nitrogen, the aryl ring has at least one substitutent or contains one other hetero atom or group.

X is an anion such as halide, nitrate, sulfate, hydroxide, etc.

n is an integer equal to the number of monomer units in the polymer required to give a polymer with a molecular weight in the range of about 800–3,000,000.

m is an integer equal to the number of anions required to maintain neutrality.

A preferred molecular weight range is about 1,500–150,000.

The following are examples of the preferred polycationic polymer classes having repeating polymer units such as those illustrated below.

(1) where Z is sulfur, a sulfonium polymer

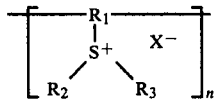

and one example is derived from the monomer $H_2C=CHCO_2CH_2CH_2S(CH_3)_2Cl$, poly-2-acryloxyethyldimethylsulfonium chloride; $R_1$=2-acryloxyethyl, $R_2$=methyl, $R_3$=methyl, $R_4$=nonexistent, and X=chloride;

The above formula and R groups show a polymer wherein the R groups are not hydrogen.

(2) where Z is phosphorous, a phosphonium polymer

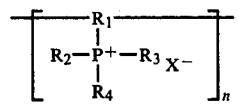

and an example monomer is

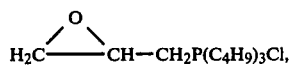

glycidyltributylphosphonium chloride; $R_1$=glycidyl, $R_2$=butyl, $R_3$=butyl, $R_4$=butyl, and X=chloride;

The above example shows a polymer wherein the cation Z is pendent and not in the polymer chain and at least three of the R groups are the same.

(3) where Z is nitrogen, quaternary ammonium polymers;

(3a) integral alkyl quaternary, example polymer:

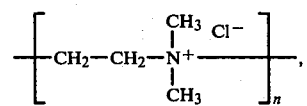

polydimethylethyleneammonium chloride, example polymer:

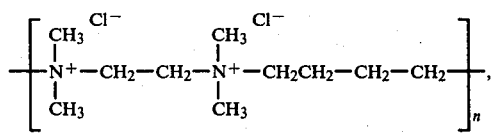

the condensation product of N,N,N',N'-tetramethylethylenediamine and 1,4-dichlorobutane;

The above examples show polymers wherein the R groups are not hydrogen; wherein the cation Z is in the polymer chain and in the second example is also in one of the R groups; wherein two of the R groups are the same and two of the R groups are different; and wherein at least two of the R groups are linear aliphatic radicals with not more than one and/or two different radicals in the polymer chain.

(3b) Integral quaternary in cyclic ring, example polymer:

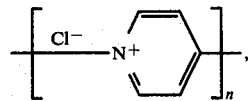

the condensation product of 4-chloropyridine;

(3c) integral alkyl, aryl quaternary, example polymer:

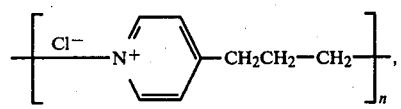

the condensation product of 1-(4-pyridyl)-3-chloropropane; another example polymer:

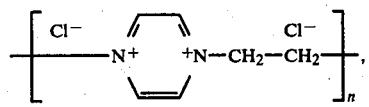

the condensation product of pyrazine and 1,2-ethylene dichloride;

The above examples show polymers with one or more cationic Z groups in the polymer chain and in an aromatic radical which is also in the polymer chain with two different R radicals which are also in the polymer chain. Thus, the examples show heterocyclic aromatic and linear R groups which are in the polymer chain.

(3d) Pendent alkyl quaternary, example polymer:

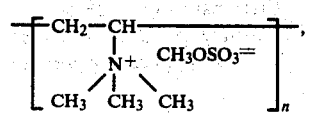

polyvinyltrimethylammonium methylsulfate;

The above example shows a polymer with a pendent cationic Z radical and pendent R groups which are the same but different from the R group in the polymer chain; thus, Z and three of the R groups are not in the polymer chain.

(3e) Pendent quaternary on cyclic backbone, example polymer:

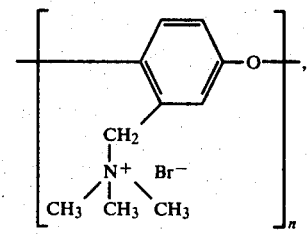

The above example shows a polymer with aromatic and hetero radicals in the polymer chain, a pendent cationic Z radical and three R groups which are aliphatic and not hydrogen or not in the polymer chain.

(3f) Pendent quaternary on carbocyclic ring, example polymer:

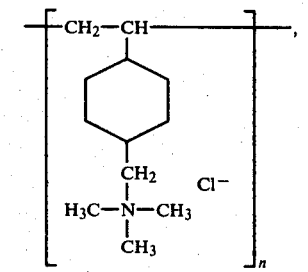

polyvinyl-4-benzyltrimethylammonium chloride;

(3g) Pendent quaternary nitrogen on polymethacrylate backbone, example polymer:

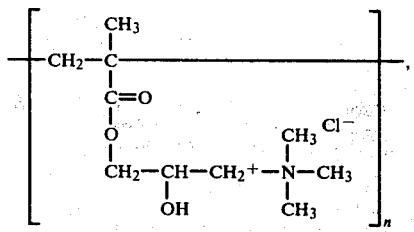

poly(3-methacryloxy-2-hydroxypropyltrimethylammonium chloride);

The above example shows different R groups with one in the polymer chain and three aliphatic R groups with one containing a cationic Z group and hetero atoms which are not in the polymer chain.

another example polymer:

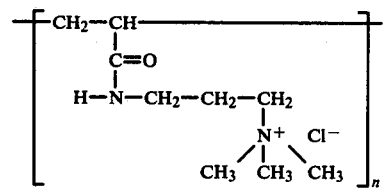

poly(acrylamido-3-propyltrimethylammonium chloride);

The above example shows a polymer with pendent R groups and cations which are not in the polymer chain, aliphatic R groups with one in the polymer chain, and a pendent group containing hetero atoms and more than one Z group.

(3h) Quaternary nitrogen in pendent heterocyclic ring, example polymers:

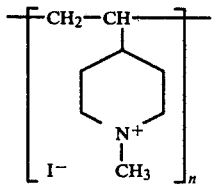

poly-4-vinyl-N-methylpyridinium iodide;

The above formula shows a polymer with a pendent hetero aromatic radical which is also a cationic radical and they are not in the organic polycationic polymer chain.

(3i) Heterocyclic ring containing quaternary nitrogen, example polymers:

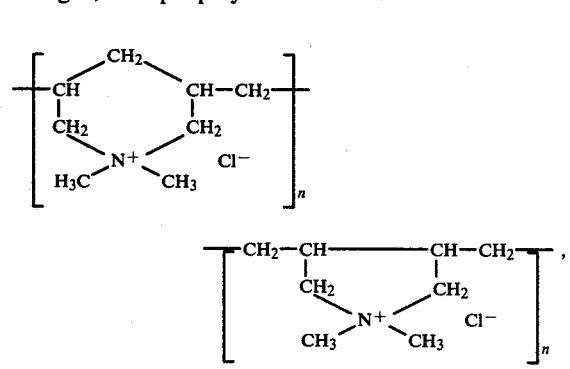

polymer of diallyldimethylammonium chloride.

The above formulae show a pendent Z cation and pendent aliphatic R groups with at least two of the R groups having the same number of carbon atoms and with two R groups having the same number of carbon atoms and being linear aliphatic radicals in the polymer chain. The formulae also show heterocyclic aliphatic groups in the polymer chain which also have pendent portions.

The above classes and subclasses of polycationic polymers can be substantially linear or branched. Examples (3a), (3b) and (3c) can be considered substantially linear polymers. Examples (1), (2), (3d), (3e), (3f), (3g), (3h) and (3i) can be considered branched. These examples show branching through at least one organic radical such as examples (1), (2), (3d), (3e), (3f), (3g), (3h) and (3i) and through a cation radical such as example (3a). Also examples (3d), (3e), (3f), (3g), (3h) and (3i) can be considered to have branching through pendent cation radicals or hetero groups.

The following examples serve to illustrate various embodiments of the invention and enable one skilled in the art to practice this invention. Parts, percentages, proportions and concentrations are by weight unless indicated otherwise.

EXAMPLES

Polycationic Polymer Test Procedure

Test Cell Composition

The polycationic polymers were tested in a simulated formation containing sand, fine sediments, and clay. The test cell was packed by placing a one-hole stopper in a glass tube. To prevent sand from falling through, a screen consisting of wire gauze overlaid with a thin layer of Pyrex wool was placed on top of the bottom stopper. Next, to prevent the sand pack from plugging the screen, a layer of straight sand was packed on top of the stopper and screen. The next layer was the sand pack; the sand pack was the testing medium. It was packed in a damp condition so that the sand, fines, and clay would adhere such that stratification of the pack was avoided. Finally, to protect the sand pack from particulate contaminants, a layer of pure sand capped the lower two layers.

The sand pack consisted of 85% by weight pure Oklahoma No. 1 Sand (70–170 U.S. Mesh), 10% by weight silica (−270 U.S. Mesh), 5% by weight montmorillonite (Wyoming bentonite-surface area about 750 $m^2$/gram) and 0.75 milliliters (ml) of brine water (enough for detectable dampness).

Test cell dimensions were: inside diameter of tube 2.32 centimeters; inside cross-sectional area of tube 4.23 $cm^2$; sand pack column height 8.04 cm; tube volume (sand pack vicinity) 33.09 $cm^3$; porosity about 30%; and pure Oklahoma No. 1 sand column height (both top and bottom columns) 1.51 cm.

The test cell composition was maintained uniform from test to test. The above figures are the average of several cells on successive tests.

| Averages of Some Test Cell Flow Rates | |
|---|---|
| Temperature °F. | Flow Rate ml/min |
| 75 | 13.67* |
| 145 | 24.25 |
| 200 | 41.50 |

| Test Sequence or Procedure | |
|---|---|
| Step | Flowing Fluid |
| 1 | Standard brine |
| 2 | Treatment solution |
| 3 | Standard brine |
| 4 | Fresh water |
| 5 | 15% HCl |
| 6 | Fresh water |
| 7 | Diesel oil |
| 8 | Fresh water |
| 9 | Diesel oil |

*K = 140.3 md

The initial standard brine step was for calibrating the sand pack. Fresh water is tap water. Fresh water and deionized water are roughly equivalent in their clay swelling properties, and they are the critical test of whether some step was effective in treating clay.

The 15% HCl step was to test the permanency of the clay treating chemical in the presence of acid.

The diesel oil-fresh water-diesel oil steps had the purpose of testing the permanence of the clay treating chemical in the presence of oil. Also, if the diesel oil rate is higher than the water rate the system was considered to be water wet.

| Standard Brine Composition | |
|---|---|
| Salt | % by Weight |
| NaCl | 7.5 |
| $CaCl_2$ | 0.55 |
| $MgCl_2.6H_2O$ | 0.42 |
| Water | 91.53 |

Pressure and Temperature

A pressure of 50 psig was maintained on the reservoir throughout all procedure steps.

The reservoir had a heating jacket which maintained the desired temperature for the test fluids. A heating tape was used on the test cell.

Berea cores were tested in a Hassler sleeve apparatus with the core and reservoir heated to test temperature. The 2-inch long core rested on a cushion of 40–60 sand ($\frac{3}{4}$″ high) and was protected from unavoidable trash by a buffer of 40–60 sand on top ($\frac{3}{4}$″ high) with an uppermost cap of Oklahoma No. 1 sand ($\frac{1}{4}$″ high). These sand layers provided approximately 2% of the cell resistivity.

| Berea Sandstone Core Properties* | |
|---|---|
| | Average |
| X-Ray Analysis | |
| Quartz | 79.0% |
| Dolomite | 4.0% |
| Kaolinite | 11.0% |
| Illite | 3.7% |
| Montmorillonite and mixed layer clays | 2.3% |
| Other Analysis | |
| Acid Solubility | 2.8% |
| Porosity | 21.96% |
| Permeability | 208 md |

*This is a sample of sixteen cores and is considered representative of the sandstone block used for test cores.

TABLE 1

| Code for Clay Treating Chemicals And Solutions Used in the Examples | |
|---|---|
| Chemical Code | Description |
| Control | The absence of any clay treating chemical. |
| OHA1 | Refers to hydroxy aluminum compounds which have the following proportions in the examples: $Al_2(OH)_5Cl$. |
| $ZrOCl_2$ | Zirconyl chloride analyzed to be $ZrOCl_2.8H_2O$. |
| PEI | Polyethyleneimine, a polymer of aziridine. |
| PDMDAA | Polydimethyldiallylammonium chloride. |
| SB | Standard Brine. |
| FW | Fresh water. |
| TEPA | Tetraethylenepentamine |
| EDCA | Ethylene dichloride and ammonia condensate. |
| EDCAM | Ethylene dichloride and ammonia condensate quaternized with methyl chloride. |
| TETA | Triethylenetetraamine. |
| BDCTMDA | 1,4-dichlorobutene condensate with N,N,N′,N′—tetramethylethylenediamine. |
| DMAECH | Dimethylamine condensate with epichlorohydrin. |

TABLE 1-continued

Code for Clay Treating Chemicals And Solutions Used in the Examples

| Chemical Code | Description |
|---|---|
| BDMAECH | Dimethylamine condensate with epichlorohydrin branched with ammonia. |
| DMABCD | Dimethylamine condensate with 1,4-dichlorobutane. |
| HXDA | 1,6-hexanediamine. |
| DEAPA | Diethylaminopropylamine. |
| TADATO | A triethanolamine/diethanolamine/tall oil condensate. |
| TADATOQ | TADATO quaternized with $CH_3Cl$. |
| HBEOTO | Hexanediamine production bottoms reacted with ethylene oxide and esterified with tall oil and acidified with the hydrochloride. |
| PBMDMSA | Poly-2-butenylene-2-methylenedimethylsulfonium chloride. |
| PAOEDMS | Polyacryloxy-2-ethylenedimethylsulfonium methosulfate |
| PEOMTBP | Polyethylene-2-oxy-1-methylenetributylphosphonium chloride. |

TABLE 2

Clay Treatment Flow Tests at 75° F.

| Example No. | | 1 | 2 | 3 | 4 | 5 | 6 | 7 | 8 | 9 |
|---|---|---|---|---|---|---|---|---|---|---|
| Treatment Solution | | | | | | | | | | |
| Chemical or Polymer | | Control | Control | PDMDAA | PDMDAA | PDMDAA | PDMDAA | PDMDAA | PDMDAA | PDMDAA |
| Molecular Weight[b] | | NA | NA | 37,000 | 37,000 | 37,000 | 37,000 | 37,000 | 50,000 | 75,000 |
| Concentration, % | | 0 | 0 | 4 | 2 | 0.4 | 0.4 | 2 | 2 | 2 |
| Solvent | | SB | SB | FW | FW | FW | SB | SB | SB | SB |
| Calibration | | | | | | | | | | |
| Standard brine, ml/min. | | 14.6 | 13.4 | 12.3 | 13.4 | 15.2 | 14.6 | 14.4 | 12.8 | 15.2 |
| Flow Tests, % of Calibration | | | | | | | | | | |
| Solution | ml | | | | | | | | | |
| Standard brine | 500 | 100.0 | 100.0 | 100.0 | 100.0 | 100.0 | 100.0 | 100.0 | 100.0 | 100.0 |
| Treatment solution | 300 | — | — | 17.1 | 23.1 | 3.5[a] | 80.8 | 49.3 | 39.8 | 31.5 |
| Standard brine | 500 | — | — | 99.2 | 82.1 | 5.0[a] | 101.4 | 102.8 | 100.0 | 92.1 |
| Fresh Water | 500 | 1.0[a] | — | 99.2 | 88.1 | — | 68.5 | 104.2 | 100.0 | 81.6 |
| 15% HCl | 400 | — | 70.1 | 86.1 | 73.1 | — | 71.2 | 73.6 | 79.7 | 82.9 |
| Fresh Water | 500 | — | 0.6 | 94.3 | 85.1 | — | 61.6 | 91.7 | 85.9 | 68.4 |

[a]Flow was terminated before the full volume indicated was delivered. [b]The molecular weights are believed to be about ±10%.

TABLE 3

Temperature and Solvent Variations with Organic Polycationic Polymers

| Example No. | | 10 | 11 | 12 | 13 | 14 | 15 | 16 | 17 |
|---|---|---|---|---|---|---|---|---|---|
| Test Temperature, °F. | | 145° | 145° | 145° | 200° | 145° | 200° | 145° | 145° |
| Treatment Solution | | | | | | | | | |
| Chemical or Polymer | | Control | PDMDAA | PDMDAA | PDMDAA | PDMDAA | PDMDAA | PEI | PDMDAA |
| Molecular Weight[b] | | NA | 37,000 | 37,000 | 37,000 | 37,000 | 37,000 | 20,000 | 37,000 |
| Concentration, % | | 0 | 2 | 0.4 | 0.4 | 0.4 | 0.4 | 0.1 | 0.4 |
| Solvent | | SB | SB | SB | SB | 15% HCl | 15% HCl | 15% HCl | 3% $CaCl_2$ |
| Calibration | | | | | | | | | |
| Standard brine, ml/min. | | 23 | 26 | 32 | 38 | 18 | 45 | 19.6 | 29.0 |
| Flow Tests, % of Calibration | | | | | | | | | |
| Solution | ml | | | | | | | | |
| Standard brine | 500 | 100.0 | 100.0 | 100.0 | 100.0 | 100.0 | 100.0 | 100.0 | 100.0 |
| Treatment solution | 300 | — | 50.0 | 90.6 | 96.1 | 63.9 | 62.6 | 98.0 | 65.5 |
| Standard Brine | 500 | — | 111.5 | 106.0 | 135.5 | 136.1 | 113.3 | 132.7 | 75.2 |
| Fresh water | 500 | 1.1[c] | 126.9 | 111.9 | 147.0 | 130.0 | 120.0 | 167.3 | 82.8 |
| 15% HCl | 400 | — | 40.0 | 93.8[a] | 39.5 | — | — | — | 20.0 |
| Fresh water | 500 | — | 100.0 | 156.3 | 131.5 | — | — | — | 79.3 |

[a]A solution of 3% HF and 12% HCl was substituted for 15% HCl.
[b]The molecular weights are believed to be within ±10%. The PDMDAA is number average of molecular weight; PEI is unspecified.
[c]Flow testing was discontinued after 100 ml of fresh water due to low flow rate.

TABLE 4

Organic Polycationic Polymers Consisting Generally of Alternating Ethylene and Amine Groups

| Example No. | 18 | 10 | 20 | 21 | 22 | 23 |
|---|---|---|---|---|---|---|
| Treatment Solution | | | | | | |
| Chemical or Polymer | EDCA | EDCA | EDCA | EDCAM | EDCAM | PEI |
| Molecular Weight | 7,500[a] | 25,000[a] | 1,500[b] | 2,000[b] | 2,000[b] | 20,000[c] |
| Concentration, % | 0.25 | 0.28 | 0.36 | 0.25 | 0.25 | 0.1 |
| Solvent | SB | SB | SB | SB | SB | SB |
| Solvent pH | 4 | 4 | 4 | 4 | 7 | 4 |
| Calibration | | | | | | |

TABLE 4-continued

Organic Polycationic Polymers Consisting Generally of Alternating Ethylene and Amine Groups

| Standard Brine, ml/min. | | 23.2 | 20.8 | 23.0 | 17.2 | 17.6 | 23.6 |
|---|---|---|---|---|---|---|---|
| Flow Tests[d], % of Calibration | | | | | | | |
| Solution | ml | | | | | | |
| Standard Brine | 500 | 100.0 | 100.0 | 100.0 | 100.0 | 100.0 | 100.0 |
| Treatment Solution | 300 | 80.2 | 59.6 | 108.7 | 110.5 | 110.8 | 101.7 |
| Standard Brine | 500 | 90.5 | 56.7 | 104.3 | 98.8 | 102.3 | 100.0 |
| Fresh Water | 500 | 100.9 | 46.2 | 139.1 | 130.8 | 130.7 | 35.6 |
| 15% HCl | 400 | 56.0 | 31.3 | 50.0 | 60.5 | 82.4 | 14.8 |
| Fresh Water | 500 | 120.7 | 74.5 | 156.5 | 157.0 | 210.2 | 114.4 |

| Example No. | | 24 | 25 | 26 | 27 | 28 | 29 | 30 |
|---|---|---|---|---|---|---|---|---|
| Treatment Solution | | | | | | | | |
| Chemical or Polymer | | PEI | PEI | PEI | PEI | PEI | TEPA | TETA |
| Molecular Weight | | 20,000[c] | 20,000[c] | 300[c] | 1,200[c] | 100,000[c] | 189 | 146 |
| Concentration, % | | 1.0 | 1.0 | 0.3 | 0.3 | 1.0 | 1.0 | 1.0 |
| Solvent | | SB | 15% HCl | SB | SB | 15% HCl | SB | SB |
| Solvent pH | | 4 | — | 4 | 4 | — | 4 | 4 |
| Calibration | | | | | | | | |
| Standard Brine, ml/min. | | 21.4 | 25.4 | 21.4 | 23.5 | 21.9 | 22.6 | 26.2 |
| Flow Tests[d], % of Calibration | | | | | | | | |
| Solution | ml | | | | | | | |
| Standard Brine | 500 | 100.0 | 100.0 | 100.0 | 100.0 | 100.0 | 100.0 | 100.0 |
| Treatment Solution | 300 | 7.5 | 51.2 | 123.8 | 102.1 | 11.4 | 115.0 | 139.8 |
| Standard Brine | 500 | 6.1 | 70.0 | 126.2 | 110.6 | 25.1 | 95.1 | 114.5 |
| Fresh Water | 500 | — | 94.5 | 146.7 | 139.0 | 1.1 | 2.8[d] | 0.4 |
| 15% HCl | 400 | 15.0 | — | 58.9 | 22.6 | — | — | — |
| Fresh Water | 500 | — | — | 3.9 | 4.7 | — | — | — |

[a]This molecular weight is approximately ±2,500 with chloride counter ion not included.
[b]This molecular weight is approximately ±500 with chloride counter ion not included.
[c]The spread of this molecular weight is unknown.
[d]These tests were at 145° F.

TABLE 5

Miscellaneous Organic Polycationic Polymers

| Example No. | | 31 | 32 | 33 | 34 | 35 |
|---|---|---|---|---|---|---|
| Treatment Solution | | | | | | |
| Chemical or Polymer | | BDCTMDA | DMAECH | DMAECH | DMAECH DMAECH | |
| Molecular Weight | | 1,500 | 1,750[a] | 7,500[b] | 7,500[b] | 7,500[b] |
| Concentration, % | | 0.5 | 0.37 | 0.37 | 0.185 | 0.037 |
| Solvent | | SB | SB | SB | SB | SB |
| Solvent pH | | 4 | 4 | 4 | 4 | 4 |
| Calibration | | | | | | |
| Standard Brine, ml/min. | | 23.6 | 21.2 | 19.4 | 22.2 | 30.3 |
| Flow Tests[c], % of Calibration | | | | | | |
| Solution | ml | | | | | |
| Standard Brine | 500 | 100.0 | 100.0 | 100.0 | 100.0 | 100.0 |
| Treatment Solution | 300 | 114.4 | 109.4 | 108.8 | 117.6 | 113.2 |
| Standard Brine | 500 | 111.9 | 121.2 | 134.5 | 131.1 | 122.1 |
| Fresh Water | 500 | 150.4 | 159.4 | 182.0 | 155.4 | 6.9 |
| 15% HCl | 400 | 74.2 | 44.8 | 93.8 | 82.4 | — |
| Fresh Water | 500 | 154.3 | 184.0 | 156.2 | 128.8 | — |

| Example No. | | 36 | 37 | 38 | 39 | 40 | 41 |
|---|---|---|---|---|---|---|---|
| Treatment Solution | | | | | | | |
| Chemical or Polymer | | DMAECH | DMAECH | BDMAECH | DMABDC | HXDA | DEAPA |
| Molecular Weight | | 1,750[a] | 7,500[b] | 17,500[b] | 1,500 | 116 | 130 |
| Concentration, % | | 0.37 | 0.37 | 0.37 | 0.39 | 1.0 | 1.0 |
| Solvent | | 5% HCl | 5% HCl | SB | SB | SB | SB |
| Solvent pH | | — | — | 4 | 4 | 4 | 4 |
| Calibration | | | | | | | |
| Standard Brine, ml/min. | | 26.3 | 35.3 | 21.4 | 23.1 | 22.2 | 23.0 |
| Flow Tests[c], % of Calibration | | | | | | | |
| Solution | ml | | | | | | |
| Standard Brine | 500 | 100.0 | 100.0 | 100.0 | 100.0 | 100.0 | 100.0 |
| Treatment Solution | 300 | 76.0 | 103.1 | 79.9 | 108.2 | 122.5 | 114.8 |
| Standard Brine | 500 | 85.2 | 106.2 | 130.7 | 116.9 | 104.9 | 104.4 |
| Fresh Water | 500 | 108.7 | 124.9 | 112.1 | 124.2 | 2.6 | 0.4 |
| 15% HCl | 400 | 10.9 | 85.5 | 34.6 | 51.5 | — | — |

TABLE 5-continued

Miscellaneous Organic Polycationic Polymers

| Fresh Water | 500 | 117.5 | 113.3 | 112.1 | 160.2 | — | — |

*a* The molecular weight spread is about ±250.
*b* The molecular weight spread is about ±2,500.
*c* These tests were at 145° F.

TABLE 6

Clay Treatment with Inorganic Cationic Polymers at 75° F.

| Example No. | 42 | 43 | 44 |
|---|---|---|---|
| Treatment Solution | | | |
| Chemical or Polymer | Control | HOAl | ZrOCl$_2$ |
| Molecular Weight | NA | —$^a$ | —$^a$ |
| Concentration, % | 0 | 2.5 | 1.2 |
| Solvent | 3% CaCl$_2$ | 2% KCl | 2% KCl |
| Calibration | | | |
| Standard Brine, ml/min. | 11.9 | 15.2 | 15.8 |
| Flow Tests | | | |
| Solution | ml | | | |
| Standard Brine | 500 | 100.0 | 100.0 | 100.0 |
| 3% CaCl$_2$ | 300 | 74.0 | 83.3 | 68.4 |
| Deionized Water | 300 | 60.0 | 61.8 | 41.1 |
| Treatment Solution | 100 | — | 42.8 | 34.8 |
| Overflush | 100 | — | 43.4 | 29.7 |
| Cure Time | NA | — | —$^b$ | — |
| 3% NaCl | 300 | 38.0 | 40.7 | 31.6 |
| Deionized Water | 300 | 1.1 | 44.1 | 31.6 |
| 15% HCl | 300 | — | 27.6 | 25.3 |
| Deionized Water | 300 | — | 1.0 | 0.6 |

*a* Not determined
*b* 18 hours.

TABLE 7

Organic Polycationic Polymers As Clay Control Agent in a Carbonaceous Formation

Test Sand Composition

| Material | Percent By Weight | |
|---|---|---|
| | Pack A | Pack B |
| 70–170 Mesh Sand | 75 | 0 |
| 70–170 Mesh Marble Chips | 10 | 85 |
| Through 270 Mesh Silica | 10 | 10 |
| Montmorillonite | 5 | 5 |

| Example No. | 45 | 46 | 47 |
|---|---|---|---|
| Treatment Solution | | | |
| Chemical or Polymer | Control | PDMAA | PDMAA |
| Molecular Weight | NA | 37,000 | 37,000 |
| Concentration, % | NA | 0.4 | 0.4 |
| Solvent | FW | SB | SB |
| Calibration | | | |
| Pack Used | A | A | B |
| Standard Brine, ml/min. | 15.0 | 13.6 | 3.2 |
| Flow Tests, % of Calibration | | | |
| Solution | ml | | | |
| Standard Brine | 500 | 100.0 | 100.0 | 100.0 |
| Treatment Solution | 300 | — | 105.9 | 93.8 |

TABLE 7-continued

Organic Polycationic Polymers As Clay Control Agent in a Carbonaceous Formation

| Standard Brine | 500 | — | 122.1 | 96.9 |
|---|---|---|---|---|
| Fresh Water | 500 | 2.8 | 125.0 | 109.4 |
| 15% HCl | 400 | — | 76.5 | — |
| Fresh Water | 500 | — | 169.1 | — |

TABLE 8

Water Wetting Affected by Clay Stabilization Agents

| Example No. | 48 | 49 | 50 | 51 | 52 |
|---|---|---|---|---|---|
| Extension of Example | 32 | 38 | 33 | 14 | 16 |
| Treatment Solution | | | | | |
| Chemical or Polymer | DMAECH | BDMAECH | DMAECH | PDMAA | PEI |
| Concentration, % | 0.37 | 0.37 | 0.37 | 0.4 | 0.1 |
| Solvent | SB | SB | SB | 15% HCl | 15% HCl |
| Flow Tests, % of Calibration In Original Example | | | | | |
| Fluid | ml | | | | | |
| Diesel Oil | 500 | 139.2 | 68.2 | 72.2 | 94.4 | 84.1 |
| Fresh Water | 500 | 24.1 | 16.8 | 24.2 | 13.3 | 83.7 |
| Diesel Oil | 500 | 132.1 | 61.7 | 72.2 | 85.5 | 92.9 |

TABLE 8A

Clay Treatments With Organic Polycationic Polymers Containing Oxygen Linkages

| | Example No. | | |
|---|---|---|---|
| | 52A | 52B | 52C |
| Treatment Solution | | | |
| Chemical or Polymer | TADATO | TADATO | HBEOTO |
| Concentration, % | 0.86 | 0.7 | 0.68 |
| Solvent | SB | SB | SB |
| Calibration | | | |
| Standard Brine, ml/min. | 23.0 | 27.0 | 19.7 |
| Flow Tests, % of Calibration | | | |
| Solution | ml | | | |
| Standard Brine | 500 | 100.0 | 100.0 | 100.0 |
| Treatment Solution | 100 | 89.1 | 81.5 | 56.9 |
| Standard Brine | 500 | 95.7 | 98.5 | 93.4 |
| Fresh Water | 500 | 115.2 | 136.3 | 136.0 |
| 15% HCl | 400 | 46.1 | 33.7 | 39.1 |
| Fresh Water | 500 | 140.4 | 118.5 | 181.7 |
| Diesel Oil | 500 | 110.9 | 84.4 | 97.5 |
| Fresh Water | 500 | 33.9 | 26.7 | 86.3 |
| Diesel Oil | 500 | 113.5 | 86.7 | 86.8 |

TABLE 8B

Clay Treatment With Cations Other Than Nitrogen

| | Example No. | | |
|---|---|---|---|
| | 52D | 52E | 52F |
| Treatment Solution | | | |
| Chemical or Polymer | PBMDMSC | PAOEDMS | PEOMTBP |
| Concentration % | 1.0 | 1.0 | 1.0 |
| Solvent | SB | SB | SB |
| Calibration | | | |
| Standard Brine, ml/min | 24.0 | 23.2 | 26.9 |
| Flow Tests, % of Calibration | | | |
| Solution | ml | | | |
| Standard Brine | 500 | 100.0 | 100.0 | 100.0 |

TABLE 8B-continued

Clay Treatment With Cations Other Than Nitrogen

| | Example No. | | |
|---|---|---|---|
| | 52D | 52E | 52F |
| Treatment Solution | 100 | 76.6 | 75.8 | 59.0 |
| Standard Brine | 500 | 95.3 | 95.7 | 93.2 |
| Fresh Water | 500 | 128.3 | 131.4 | 141.3 |
| Fresh Water | 500 | 32.5 | 48.6 | 60.3 |
| Diesel Oil | 500 | 111.1 | 95.7 | 97.6 |
| 15% HCl | 400 | 39.6 | 38.4 | 33.4 |
| Fresh Water | 500 | 146.7 | 126.4 | 178.9 |
| Diesel Oil | 500 | 110.8 | 100.2 | 97.6 |

TABLE 9

Clay Stabilization Tests in Berea Cores
Pressure: 50 psig  Temperature: 145° F.

| | | Example No. | | | | | | | |
|---|---|---|---|---|---|---|---|---|---|
| | | 53 | 54 | 55 | 56 | 57 | 58 | 59 | 60 | 61 |
| Treatment Solution | | | | | | | | | | |
| Chemical or Polymer | | None | None | ZrOCl$_2$ | ZrOCl$_2$ | ZrOCl$_2$ | ZrOCl$_2$ | OHAl | PDMDAA | PDMDAA |
| Concentration, % | | — | — | 1.2 | 1.2 | 1.2 | 1.2 | 2.5 | 0.4 | 0.4 |
| Solvent | | Control | Control | 2% KCl | 2% KCl | 4% KCl | 3% HCl | FW | SB | SB |
| Calibration Standard Brine, ml/min. | | 14.0 | 11.8 | 27.0 | 24.8 | 10.6 | 17.2 | 16.0 | 19.0 | 8.3 |
| Flow Tests, % of Calibration | | | | | | | | | | |
| Solution | ml | | | | | | | | | |
| Standard Brine | 300 | 100.0 | 100.0 | 100.0 | 100.0 | 100.0 | 100.0 | 100.0 | 100.0 | 100.0 |
| Treatment Solution | 200 | — | — | 39.3 | 145.2[b] | —[c,d] | 50.0 | 87.5 | 90.5 | 85.5 |
| Standard Brine | 300 | — | — | 3.7 | 28.2 | — | 55.6 | 62.5[e] | 105.3 | 96.4 |
| Fresh Water | 300 | 0.5 | — | 48.0 | 19.8 | — | 104.7 | 58.7 | 121.1 | 108.4 |
| 15% HCl | 250 | — | 35.6 | — | 46.4 | — | — | 4.3 | 16.3 | 38.6 |
| Fresh Water | 300 | — | 211.7[a] | — | 100.8 | — | — | 215.6 | 204.2 | 596.4 |
| Diesel Oil | 300 | — | — | — | — | — | — | 112.5 | 60.5 | 255.4 |
| Fresh Water | 300 | — | 52.5 | — | — | — | — | 35.0 | 13.2 | 104.8 |
| Diesel Oil | 300 | — | — | — | — | — | — | 106.3 | 33.7 | 224.1 |

[a]Standard brine substituted for fresh water in this flow test step so that the increase in permeability by acidizing could be measured.
[b]The treatment solution was preceded by 100 ml of 5% HCl.
[c]The treatment solution was preceded by 100 ml of 4% KCl.
[d]There was no detectable flow rate after injecting 85 ml of treatment solution.
[e]The treatment solution was followed by an overflush of 100 ml of 1% KCl.

TABLE 10

Remedial Treatments to Correct Previous Damage to Permeability of Berea Cores

| Example No. | 62 | | | 63 | | | 64 | | |
|---|---|---|---|---|---|---|---|---|---|
| Treatment Solution | | | | | | | | | |
| Chemical or Polymer | Control | | | Control | | | Control | | |
| Concentration, % | — | | | — | | | — | | |
| Solvent | None | | | SB | | | 5% HCl | | |
| Fluid Injected | Vol. | (D) | Rate | Vol. | (D) | Rate | Vol. | (D) | Rate |
| Standard Brine | 480 | (F) | 22.6 | 390 | (F) | 15.0 | 510 | (F) | 26.0 |
| Deionized Water | 76 | (F) | 3.6 | 23 | (F) | 0.5 | 155 | (F) | 0.6 |
| Treatment Solution | — | (R) | — | 98 | (R) | 1.42 | 102 | (R) | 2.4 |
| Deionized Water | — | (F) | — | 36 | (F) | 0.7 | 237 | (F) | 33.0 |
| Deionized Water | — | (F) | — | — | (F) | — | 1021 | (F) | 29.0 |
| Deionized Water | — | (F) | — | — | (F) | — | 2801 | (F) | 15.2 |

| Example No. | 65 | | | 66 | | | 67 | | | 68 | | |
|---|---|---|---|---|---|---|---|---|---|---|---|---|
| Treatment Solution | | | | | | | | | | | | |
| Chemical or Polymer | PMDAA | | | ZrOCl$_2$ | | | PMDAA | | | ZrOCl$_2$ | | |
| Concentration, % | 0.4 | | | 2.2 | | | 0.4 | | | 2.2 | | |
| Solvent | SB | | | SB | | | 5% HCl | | | 5% HCl | | |
| Fluid Injected | Vol. | (D) | Rate | Vol. | (D) | Rate | Vol. | (D) | Rate | Vol. | (D) | Rate |
| Standard Brine | 300 | (F) | 10.6 | 390 | (F) | 17.7 | 450 | (F) | 13.4 | 420 | (F) | 18.0 |
| Deionized Water | 96 | (F) | 4.4 | 10 | (F) | 0.2 | 348 | (F) | 0.82 | 7 | (F) | 0.2 |
| Treatment Solution | 98 | (R) | 3.5 | 28 | (R) | 0.03 | 97 | (R) | 4.3 | 92 | (R) | 1.9 |
| Deionized Water | 30 | (F) | 8.1 | 7 | (F) | 0.02 | 728 | (F) | 13.0 | 234 | (F) | 29.0 |
| Deionized Water | 450 | (F) | 11.4 | — | (F) | — | 1505 | (F) | 25.0 | 1008 | (F) | 12.0 |
| Deionized Water | 600 | (F) | 11.4 | — | (F) | — | 2717 | (F) | 25.0 | 2705 | (F) | 4.0 |

Control = Blank or no agent.
— = Not run.
Vol = Flow rate in ml/min.
(D) = Direction of flow.
(F) = Flow in "forward" direction, i.e., original direction.
(R) = Flow in reverse direction.
Pressure - 50 psig.
Temperature = 145° F.

EXAMPLE NO. 69

A sample of Milk River formation from a well in the vicinity of Medicine Hat, Alberta, Canada was placed in fresh water. The sample begain to separate at the laminations in ten seconds. In one minute sloughing of the edges was observed; in five minutes, the sample had disintegrated into a non-cohesive mound.

EXAMPLE NO. 70

A sample of Milk River formation was placed in fresh water containing 0.8% PDMDAA. There was no observable decomposition of the sample. In 24 hours, there was a trace of separation of the laminations; in six months no other evidence of disintegration was seen; the sample had no sloughing and the jagged edges of the laminations at the sample edges were still quite distinct.

Examples 69 and 70 show that PDMDAA can prevent the cave-ins of well bores penetrating so-called "heaving shales" or "gumbo shales." These water sensitive formations are not uncommon and cause problems during drilling by caving into the well bore and seizing the the drill pipe. Besides stuck drill pipe problems, water sensitive formations can cause out-of-gauge holes, and problems in placing casing when drilling is complete. Examples of water sensitive formations that give problems in drilling, running casing, or cementing wells are Milk River shale, Canada; Atoka sand, East Oklahoma; Glenrose shale, South Louisiana; and Anawhac shale, South Texas.

TABLE 11

| Treatments With Organic Polycationic Polymer In A Polar Solvent | | | | |
|---|---|---|---|---|
| Example No. | 71 | 72 | 73 | 74 |
| Treatment Solution | | | | |
| Chemical or Polymer | Control | PDMDAA | DMAECH | DMAECH |
| Molecular Weight | 0 | 37,000$^a$ | 1750$^b$ | 7500$^c$ |
| Concentration, % | 0 | 0.4 | 0.37 | 0.37 |
| Solvent | Methanol | Methanol | Methanol | Methanol |
| Calibration | | | | |
| Standard Brine, ml/min. | 25.6 | 25.0 | 24.2 | 22.9 |
| Flow Tests, % of Calibration | | | | |
| Solution ml | | | | |
| Standard Brine 400 | 100.0 | 100.0 | 100.0 | 100.0 |
| Treatment Solution 100 | 107.0 | 142.8 | 99.6 | 110.5 |
| Standard Brine 400 | 77.7 | 93.2 | 123.6 | 91.7 |
| Fresh Water 400 | 11.7 | 115.6 | 159.1 | 138.0 |
| 15% HCl 400 | — | 56.8 | 57.0 | 41.9 |
| Fresh Water 500 | — | 95.6 | 120.7 | 130.1 |

$^a \pm 3,750$
$^b \pm 250$
$^c \pm 2,500$

EXAMPLE 75

In the Bantry Field near Brooks, Alberta, Canada, the Milk River formation gave much trouble. The heaving formation caused irregular hole size which was bad for proper cementing of casing in the hole. In addition, it was difficult to get logging tools through the Milk River formation in order to test for oil and/or gas.

Seven wells were drilled using DMAECH. The drilling fluid sump system was arranged to permit "clear water" drilling. After the top of the Milk River interval was approached at approximately 1000 feet deep, DMAECH was metered into the pump suction throughout the drilling of the remainder of the zone. It took only an average of six hours to reach the base of the producing zone at approximately 1700 feet.

The caliper log showed the hole to be smooth-walled "like a gun barrel." Logging tools were lowered through the zone with ease. The wells were cased with no problems during cementing. After well completion by casing perforation, the wells were stimulated by fracturing using one gallon of 40% DMAECH solution per 1000 gallons of fracturing fluid throughout the treatment.

The wells stabilized producing an average 300,000 cubic feet of gas per day against a pressure of 240 psig. This deliverability is, on the average, threefold better than neighboring wells that used potassium chloride instead of DMAECH.

EXAMPLE 76

PDMDAA Treatment Vs. 10% KCl Survey of Production Results in West virginia

In a survey of production from wells treated in late 1976 and early 1977, PDMDAA has proven to be a far superior agent for use in a local, fresh water sensitive formation, the Big Injun sand. The nine wells were chosen at random, revolving around the first PDMDAA treatment in 1976. All wells treated were near the center of the Big Injun Field, near Lizemores, Clay County, West Virginia. The five wells treated with PDMDAA and four 1% KCl wells all had the same basic formation criteria:

12-15% average porosity
1-5 millidarcy average permeability
20 feet of net pay
Average depth—2500-2600 feet All wells were treated down 4½" casing at 20-25 barrels per minute at approximately 1900-2300 PSI with the following materials:

Cellulose derived gelling agent—20 lbs/1000 gallons
Antifluid loss agent—20 lbs/1000 gallons
Citric acid—10 lbs/1000 gallons
Cationic non-emulsifying agent—1 gal./1000 gallons
500 sacks—20-40 sand
200 sacks—10-20 sand
500 gallons—HCl (15%) acid
900-1000 barrels of sand laden fluid The only difference was that five wells were treated with 40% PDMDAA solution at ½ gallon per 1000 gallons throughout the job and four were treated with 1% KCl.

Other than the obvious benefit of a savings of about $500.00 per well, the use of PDMDAA supported the following conclusions:

1. The wells cleaned up faster.
2. The open flow potential for an average well treated with PDMDAA was found to be 31% higher than a similar well treated with 1% KCl.
3. The average first year production of the PDMDAA treated wells was 82% higher than those treated with 1% KCl.
4. Last and more important, taking into consideration the higher open flow values of the PDMDAA treated wells, the wells treated with PDMDAA produced at a higher percentage of their open flow values: 13% for PDMDAA versus 9% for 1% KCl.

The operator estimated that the wells treated with PDMDAA generated $42,000 more revenue than the KCl wells.

Table 1 gives the code for clay treating chemicals and solutions used in the examples.

Table 2, Examples 1-9, are room temperature tests of various molecular weights of polydiallydimethylammonium chloride. The first two examples provide controls or specimen of the results in the absence of treatment with clay controlling chemicals. The result of Example 2 is interesting because hydrochloric acid is often used as a clay control chemical. Examples 3 and 4 provide instances of using fresh water as the carrying fluid for the clay treating chemical. Examples 5 and 6 indicate that at lower concentrations of clay control chemicals may require salt in the carrying fluid (Treatment Solution). Perhaps there is a short reaction time before the clay treating chemical can attach to the clay and during this time interval, salinity is required to hold the clay in check. Examples 7, 8 and 9 may indicate that the optimum molecular weight is passed because the protection afforded by the polydiallyldimethylammonium chloride declines with molecular weight.

Table 3, Examples 10-17, illustrate the temperature and solvent variations with organic polycationic polymers.

Example 10 shows that the sand pack can be expected to plug when fresh water is introduced without preliminary treatment with a clay stabilization agent. The primary difference between Example 10 and Example 1 is temperature.

Examples 10 through 17 provide a variety of temperatures and solvents for PDMDAA as contrasted with Examples 1 through 9. As indicated in Footnote a for Example 12, the increase in flow rate for the fresh water phase after acid may be due to dissolving of clay and fines by the hydrofluoric acid rather than the sole effect of PDMDAA. The use of organic polycationic polymers in conjunction with HF solutions is an important application.

Table 4, Examples No. 18-30, illustrates organic polycationic polymers consisting generally of alternating ethylene and amine groups.

The characteristic shared by the polymers is the structure —$CH_2$—$CH_2$—N. However, variations on the nitrogen atom are several and may occur in the same polymer molecule, i.e:

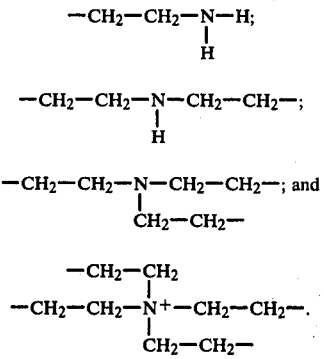

Supposedly EDCA and PEI are the same polymer arrived at by different synthesis but their behavior is different. Compare Example 20 with Example 27. Similar molecular weights and concentrations give similar results until the last flow rate phase (fresh water after 15% HCl). Evidently PEI is washed off by HCl.

With Examples 18, 19 and 20, it would appear that there is an optimum molecular weight with Example 19 being somewhat too high.

The pH difference between Examples 21 and 22 indicates that EDCAM is a little better at a neutral pH. Since EDCAM is quaternized, pH should not alter the nitrogen atoms in this polymer.

The remaining compound in Table 4 has primary, secondary and tertiary amines present and some have a percentage of quaternary amines. Adjusting the pH to 4 essentially transforms the primary, secondary and tertiary amines to the ammonium state (amine hydrochloride).

Examples 29 and 30 are preferred embodiments of Brown U.S. Pat. No. 2,761,843. Example 30 is in claims 6 and 11 of U.S. Pat. No. 2,761,843 and both are in the table at column 6 of Brown U.S. Pat. No. 2,761,843. These two compounds fail to prevent plugging of the test cell sand and clay pack with fresh water. It is believed that the molecular weights of TEPA and TETA are too low and that cation exchange takes place rapidly when the standard brine is passed through. This removal of the amine oligomers allows the clay to swell when fresh water passes through.

The flow tests in this invention more closely resemble the actions of a producing geological formation that do the washing techniques of Brown U.S. Pat. No. 2,761,843, column 5, lines 25-74. In this invention, the technique used attempts to simulate an actual well condition; that is:

Step 1—Calibration with brine simulates the flow of formation fluid.

Step 2—Treatment with a clay control agent simulates treatment of the well.

Step 3—Brine flow simulates placing the well back on production. This step checks to see if formation brine will remove the clay control agent. Monomeric clay control agents such as potassium, ammonium or calcium ion are removed in this step.

Step 4—Fresh water flow simulates introduction of a foreign water into the formation.

Step 5—15% HCl flow simulates acidizing treatment of the formation. If it is advantageous later in the life of the well to clean it up or to stimulate the well with acid, it is an advantage to have the clay control agent resistant to removal by cation exchange with hydrogen ion.

Step 6—Fresh water flow simulates introduction of foreign water into the formation. This checks the resistance of the clay control agent to acid.

The Brown technique is more appropriate to lake or pond clarification and sewage treatment where many polycationic compounds are used, than to treating oil or water wells.

Table 5, Examples 31-41, contains examples of organic polycationic polymers with different constitution from those in Tables 2, 3 and 4. Examples 31 and 39 have an unsaturation in the carbon linkage. Examples 32 through 38 have a hydroxyl group on the carbon linkage.

With the exception of Examples 40 and 41, these are effective clay control agents. Examples 33, 34 and 38 show concentration effects with Example 38 having an inadequate concentration.

Table 6, Examples 42–44, contains inorganic clay control agents. Examples 43 and 44 contain inorganic polycationic polymers according to the literature.

Example 42 serves a dual purpose. It is the control for Examples 43 and 44 and it is also an example of removal of a monomeric cationic clay control agent with a brine.

Examples 43 and 44 show that that the inorganic polycationic polymers lack resistance to acid so if a well operator desired to acidize his well perhaps a year after treating with an inorganic clay control agent, it would be advisable to re-treat the clay in the well after acidizing.

Table 7, Examples 45–47, provides examples of how an organic polycationic polymer can function as a clay control agent in a carbonaceous formation. The inorganic agents such as hydroxy aluminum (HOAl) are not recommended for formation containing more than about 5% carbonate material because reaction of the acid (low pH) salt with the carbonate will convert the hydroxy aluminum chloride to the ineffective aluminum hydroxide. Furthermore, aluminum hydroxide has the distinct possibility of acting as a plugging precipitate in the formation capillaries. The metallic salts of Veley et al U.S. Pat. No. 3,382,924 are also acidic in pH and tend to be incompatible with carbonate components of a formation.

Example 45 shows that a formation containing carbonate and clay can have its fluid production capacity damaged. On the other hand, Example 46 indicates that an organic polycationic polymer can prevent loss of permeability in a clayey carbonate containing formation. The increase in permeability after acid in Example 46 is probably due to removal of carbonate by acid.

Since the marble chips were angular in particle shape, they produce lower permeability than the sand they replaced, although the particles of each closely fit the same mesh size. Example 47 evidently exhibits a low flow rate in calibration because of this. In Example 47 an organic polycationic polymer demonstrates that it is capable of preventing loss of permeability due to swelling and/or migration of included fines and clay in the formation even when carbonate is the major component of the formation.

Table 8, Examples 48–52, illustrates that polycationic polymers do not oil wet the formation.

Since cationic surfactants can treat clays and prevent clay and fines swelling and/or migration, but are subject to the objection that they are causing the formation to be oil wet, it seemed prudent to check the organic polycationic polymers for their ability to oil wet or water wet a formation. Certain examples have additional flow rate phases added to the test procedure, hydrocarbon, fresh water and hydrocarbon. Diesel oil was a convenient hydrocarbon to use. Examples 48 through 51 show a pattern of high diesel oil flow and low water flow. This is a good indication for water wetness. Example 52 indicates a "neutral" condition, not particularly oil or water wet.

The encouraging things about examples 48 through 52 are that the diesel oil had a viscosity of about 2.5 times that of the fresh water and yet high diesel oil flow rate resulted. Also, when two phases or fluids are present in the same capillary flow system, there exists a condition called "relative permeability" whereby neither flow rate is as high as when only a single phase or fluid is present. In fact, the sum of the relative permeability to oil and the relative permeability to water when both oil and water are present in the pore spaces seldom equals the permeability of the formation with only one fluid present. In almost all cases the sum will be less.

These flow rates are rates after the preceding fluid had ceased to flow for practical purposes. This does not mean that the other fluid is completely washed out by the flow. On the contrary, an equilibrium is reached whereby there is an irreducible saturation established. The nonflowing fluid is present even if it is no longer mobile. The wetting fluid usually clings to the capillary walls while the non-wetting fluid is usually present as globules trapped in pore enlargements.

Examples 49 through 51 not only show that the generally undesirable oil wetting by the organic polycationic polymers is not likely but that they can improve the ratio of water to oil produced from the formation. This is a distinct advantage.

Table 8A, Examples 52A–52C, are examples of polymers containing ester and ether linkages. These condensates contain tall oil or tall oil condensates. They gave good protection to the clays and displayed good resistance to being washed off with acid.

There was concern about the long carbon chains of tall oil causing oil wetting. However, Examples 52A and 52B indicate water wetness and 52B shows a "neutral" wetness.

Table 9, Examples 53–61, illustrates clay stabilization tests made on Berea cores.

The Berea formation is found in the state of Ohio and vicinity. It is often used in the petroleum industry as a standard for scientific and/or engineering testing. Natural formations often vary from one cubic foot to another. Differences are noticeable in the same block 6"×8"×6" of formation. Some Berea sections do not contain sufficient clay to be water sensitive. The sections selected for testing were tested prior to use to be reasonably certain that they were sensitive to plugging with fresh water.

Example 53 establishes that the cores from this block of Berea sandstone are sensitive to fresh water flow. Example 54 is also a control test. In Example 54 acid is used after calibration. Although there was only about 2.8% acid solubility, it must be in a strategic location in the capillaries because the flow rate doubled after acid. As can be seen in Footnote a, brine was used to ascertain the results of acidizing. The following fresh water flow phase indicates that although the acid opened the core considerably, the clays are still in condition to do considerable damage to the permeability.

Examples 55 through 58 indicate that the carbonate content of the core interferes with injection of the inorganic polycationic polymer unless acid is used as the solvent. If the carbonate content were higher than 2.8%, say 10%, the acid solvent would not be sufficient.

Example 59 shows that hydroxy aluminum can treat these particular cores. The acid solubility of 2.8% is well within the expected tolerance of 5% for hydroxy aluminum. The use of an acid carrying fluid would alter the hydroxy aluminum prior to injection into the core.

Examples 60 and 61 show that pH is not a factor in the treatment of clays with an organic polycationic polymer. Good initial fresh water flow rates result without resorting to acid carrying fluids.

Table 10, Examples 62–68, illustrates the remedial treatments to correct previous damage to permeability of Berea cores.

It is believed that prevention of permeability loss caused by swelling and/or migrating clays and other fines is the best method of insuring continued production of a well. However, often it is necessary to treat previously damaged formation.

Examples 62, 63 and 64 are controls that indicate that the cores can be damaged by fresh water, that treatment with brine is not effective, and, finally, that HCl is of considerable aid in opening the core again but the core permeability is not permanently protected.

Comparing Examples 63, 65 and 66, the organic polycationic polymer appears to have provided good remedy to the damage. Then comparing Examples 64, 67 and 68, acid alone provides good initial opening of the core but the organic polycationic polymer seems to give better long term results.

Table 11, Examples 71-74, illustrates the use of alcohol or organic polar solvents other than water such as normally liquid substituted hydrocarbons.

In formations that produce no sand as long as only hydrocarbons are produced but disintegrate from their own formation water when the water table rises and water production begins, aqueous preparations of organic polycationic polymers can prevent the disintegration without the aqueous preparation itself causing disintegration. However, some well operators are fearful about introducing any aqueous fluid at all, even those designed to prevent disintegration of the formation by water wetness. In addition, it is possible that extremely water sensitive formations could exist. Therefore, to allay fear and avoid even the possibility of deconsolidating extremely water sensitive formations, an organic polycationic polymer can be dissolved in alcohol, ketone, monoethers of glycol, or other non-aqueous solvents that provide sufficient solubility for the polymers and the resulting essentially non-aqueous solution of polymers used to treat the formation.

What is claimed is:

1. A method of treating a clay-containing earth formation for the purpose of preventing or at least reducing the swelling, migration and/or dispersion of said clay to thereby stabilize said formation, said method being comprised of contacting said clay in said formation with an effective amount of an organic polycationic polymer dispersed or dissolved in a carrier fluid, said contacting being for a time sufficient for said organic polycationic polymer to replace cations to thereby transform said clay to a more stable form wherein said organic polycationic polymer contains repeating monomer units defined by at least one of the structural formulae:

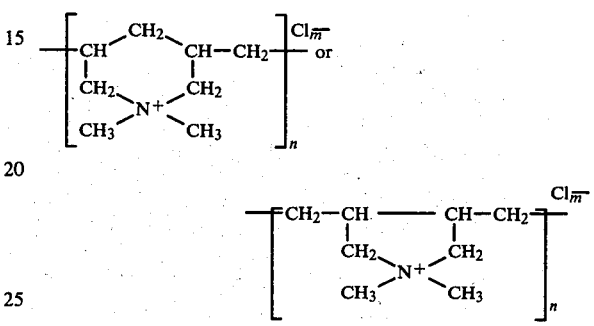

wherein:
n is an integer equal to the number of monomer units in the polymer required to give a molecular weight in the range of from about 800 to 3,000,000; and
m is an integer equal to the number of anions required to maintain electronic neutrality.

2. A method of claim 1 wherein the carrier fluid is an aqueous fluid.

3. A method of claim 1 wherein the carrier fluid is an organic liquid.

4. A method of claim 1 wherein the carrier fluid comprises both an aqueous liquid and an organic liquid.

UNITED STATES PATENT AND TRADEMARK OFFICE
CERTIFICATE OF CORRECTION

PATENT NO. : 4,374,739                     Page 1 of 7
DATED    : February 22, 1983
INVENTOR(S) : Homer C. McLaughlin and Jimmie D. Weaver It is certified that error appears in the above-identified patent and that said Letters Patent is hereby corrected as shown below:

In Column 9, line 36, delete "(-CH=CH-" and insert
-- (-CH=CH)- -- therefor.

In Column 10, line 16 thru line 23, delete

"
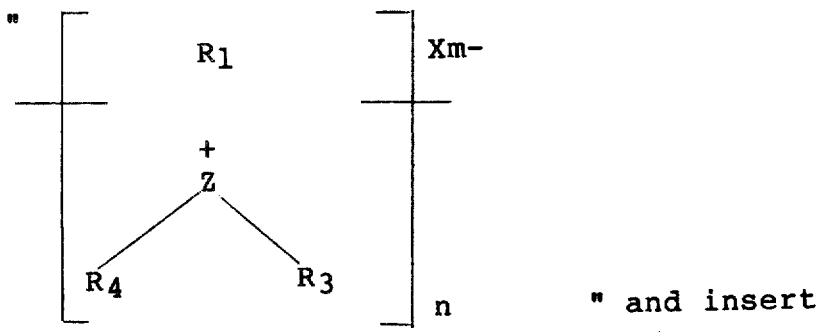
" and insert

--
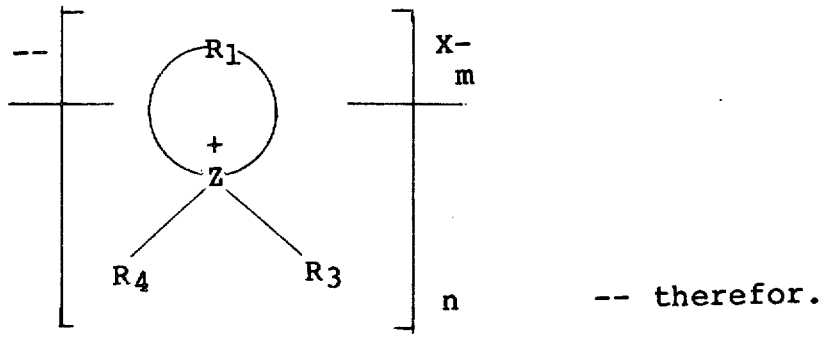
-- therefor.

UNITED STATES PATENT AND TRADEMARK OFFICE
CERTIFICATE OF CORRECTION

PATENT NO. : 4,374,739     Page 2 of 7

DATED : February 22, 1983

INVENTOR(S) : Homer C. McLaughlin & Jimmie D. Weaver

It is certified that error appears in the above-identified patent and that said Letters Patent is hereby corrected as shown below:

In Column 13, line 38 thru line 49, delete

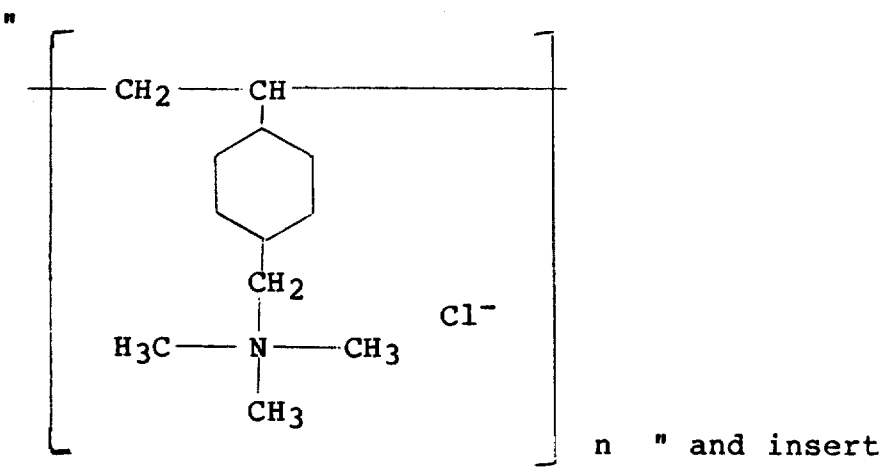

" and insert

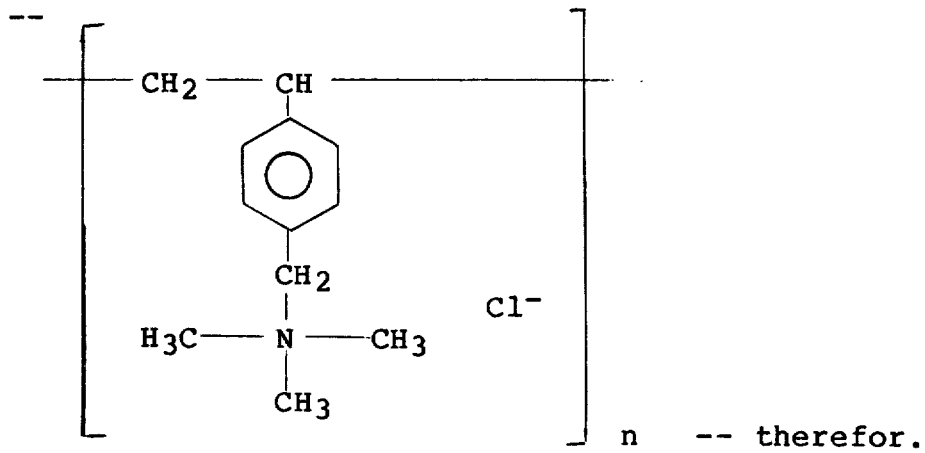

-- therefor.

UNITED STATES PATENT AND TRADEMARK OFFICE
CERTIFICATE OF CORRECTION

PATENT NO. : 4,374,739            Page 3 of 7

DATED : February 22, 1983

INVENTOR(S) : Homer C. McLaughlin & Jimmie D. Weaver

It is certified that error appears in the above-identified patent and that said Letters Patent is hereby corrected as shown below:

In Column 14, lines 48 thru 54, delete

"
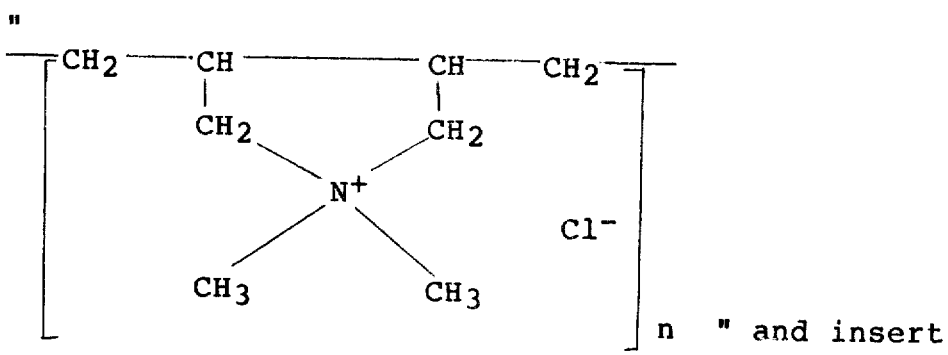
n " and insert

--
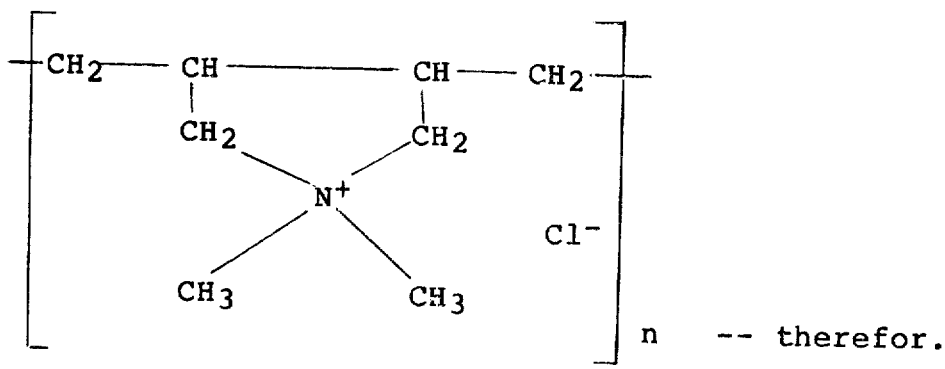
n -- therefor.

UNITED STATES PATENT AND TRADEMARK OFFICE
CERTIFICATE OF CORRECTION

PATENT NO. : 4,374,739

DATED : February 22, 1983

INVENTOR(S) : Homer C. McLaughlin & Jimmie D. Weaver

It is certified that error appears in the above-identified patent and that said Letters Patent is hereby corrected as shown below:

In Columns 17 and 18, Table 2, add a horizontal dividing line traversing the whole table between the entries "Solvent" and "Calibration".

In Columns 17 and 18, Table 2, add a horizontal dividing line traversing the whole table between the entries "ml/min." and "Flow Test, % of."

In Columns 17 and 18, Table 3, add a horizontal dividing line traversing the whole table between the entries "Solvent" and "Calibration".

In Columns 17 and 18, Table 3, add a horizontal dividing line traversing the whole table between the entries "Standard brine, ml/min." and "Flow Test, % of."

In Columns 17 and 18, Table 4, add a horizontal dividing line traversing the whole table between the entries "Solvent pH" and "Calibration".

In Columns 19 and 20, Table 4-continued, add a horizontal dividing line traversing the whole table between the entries "Standard Brine, ml/min." and "Flow Test$^d$, % of Calibration."

In Columns 19 and 20, Table 4-continued, add a horizontal dividing line traversing the whole table between the entries "Solvent pH" and "Calibration".

In Columns 19 and 20, Table 4-continued, add a horizontal dividing line traversing the whole table between the entries "Standard Brine, ml/min." and "Flow Test$^d$, % of Calibration."

UNITED STATES PATENT AND TRADEMARK OFFICE
CERTIFICATE OF CORRECTION

PATENT NO. : 4,374,739                      Page 5 of 7

DATED : February 22, 1983

INVENTOR(S) : Homer C. McLaughlin & Jimmie D. Weaver

It is certified that error appears in the above-identified patent and that said Letters Patent is hereby corrected as shown below:

In Columns 19 and 20, Table 5, under Example 34, delete one of the headings "DMAECH".

In Columns 19 and 20, Table 5, under Example 35, insert --DMAECH-- on the same line across from Chemical or Polymer.

In Columns 19 and 20, Table 5, add a horizontal dividing line traversing the whole table between the entries "Solvent pH" and "Calibration".

In Columns 19 and 20, Table 5, add a horizontal dividing line traversing the whole table between the entries "Standard Brine, ml/min." and "Flow Tests$^C$, % of Calibration."

In Columns 19 and 20, Table 5, add a horizontal dividing line traversing the whole table between the entries "Solvent pH" and "Calibration."

In Columns 19 and 20, Table 5, add a horizontal dividing line traversing the whole table between the entries "Standard Brine, ml/min." and "Flow Tests$^C$, % of Calibration."

In Column 21, Table 6 has been split into two distinct parts by the injection of Table 8 and note the original Table 6 as provided in the specifications included horizontal dividing lines traversing the whole table between the entries "Solvent" and "Calibration" and between "Standard Brine, ml/min." and "Flow Tests".

In Column 21, Table 7, add a horizontal dividing line traversing the whole table between the entries "Solvent" and "Calibration".

UNITED STATES PATENT AND TRADEMARK OFFICE
CERTIFICATE OF CORRECTION

PATENT NO. : 4,374,739

DATED : February 22, 1983

INVENTOR(S) : Homer C. McLaughlin & Jimmie D. Weaver

It is certified that error appears in the above-identified patent and that said Letters Patent is hereby corrected as shown below:

In Column 21, Table 7, add a horizontal dividing line traversing the whole table between the entries "Standard Brine, ml/min." and "Flow Tests".

In Column 21 and 22, Table 8, add a horizontal dividing line traversing the whole table between the entries "Solvent" and "Flow Tests, % of Calibration."

In Column 22, Table 8A, add a horizontal dividing line traversing the whole table between the entries "Solvent" and "Calibration".

In Column 22, Table 8A, add a horizontal dividing line traversing the whole table between the entries "Standard Brine, ml/min." and "Flow Tests".

Table 8B is split four different times. Part of Table 8B is contained in Column 22, approximately lines 55 thru 70; part is contained in Column 23, approximately lines 1 thru 9 and approximately lines 35 thru 38, these parts being split by the injection of Table 9; and the conclusion of Table 8B is contained in Column 24, approximately lines 1-8. If additional clarification is needed, please refer to Table 8B as contained in the original specification on page 41.

In Columns 23 and 24, Table 9, add a horizontal dividing line traversing the whole table between the entries "Solvent" and "Calibration".

UNITED STATES PATENT AND TRADEMARK OFFICE
CERTIFICATE OF CORRECTION

PATENT NO. : 4,374,739

DATED : February 22, 1983

INVENTOR(S) : Homer C. McLaughlin & Jimmie D. Weaver

It is certified that error appears in the above-identified patent and that said Letters Patent is hereby corrected as shown below:

In Columns 23 and 24, Table 9, add a horizontal dividing line traversing the whole table between the entries "Standard Brine, ml/min." and "Flow Tests".

In Columns 23 and 24, Table 10, add a horizontal dividing line traversing the whole table between the entries "Solvent" and "Fluid Injected".

In Columns 23 and 24, Table 10, add a horizontal dividing line traversing the whole table between the entries "Solvent" and "Fluid Injected".

In Column 25, Table 11, add a horizontal dividing line traversing the whole table between the entries "Solvent" and "Calibration".

In Column 25, Table 11, add a horizontal dividing line traversing the whole table between the entries "ml/min." and "Flow Tests".

Signed and Sealed this

Seventh Day of August 1984

[SEAL]

Attest:

GERALD J. MOSSINGHOFF

Attesting Officer  Commissioner of Patents and Trademarks